United States Patent [19]

Posso

[11] 3,990,526

[45] Nov. 9, 1976

[54] WEIGHING SCALES WITH VERTICAL GUIDANCE MEANS

[75] Inventor: Patrick P. Posso, Lausanne, Switzerland

[73] Assignee: Société Anonyme dite: Gefitec S.A., Lausanne, Switzerland

[22] Filed: Dec. 22, 1975

[21] Appl. No.: 642,903

[30] Foreign Application Priority Data
Jan. 3, 1975  Switzerland.............................. 6/75
Jan. 6, 1975  Switzerland............................. 64/75

[52] U.S. Cl................................. 177/231; 177/255
[51] Int. Cl.²................... G01G 21/28; G01G 21/24
[58] Field of Search ........... 177/169, 201, 230, 231, 177/255, DIG. 5

[56] References Cited
UNITED STATES PATENTS
2,148,523  2/1939  Baermann, Jr................... 177/255 X
FOREIGN PATENTS OR APPLICATIONS
170,829  5/1906  Germany............................ 177/231
330,397  6/1918  Germany............................ 177/231
151,626  9/1920  United Kingdom................. 177/230
736,892  9/1955  United Kingdom................. 177/231

Primary Examiner—George H. Miller, Jr.
Attorney, Agent, or Firm—Bacon & Thomas

[57] ABSTRACT

A set of weighing scales comprising a moving part able to move vertically relative to a fixed part and serving to support the load against the action of an elastic balancing device.

Its guidance device comprises at least three sets of roller trains extending in radial planes passing through the guidance axis, whereby each roller is mounted loosely on one of the parts in such a way that there is a clearance between its tread and the other part. This guidance device cooperates with at least one anti-gyratory roller extending in a tangential plane and which mounted on loosely mounted on one of the parts and which is positoned with a clearance between the two vertical members of the other part. Its indicating device is of the floating type.

10 Claims, 5 Drawing Figures

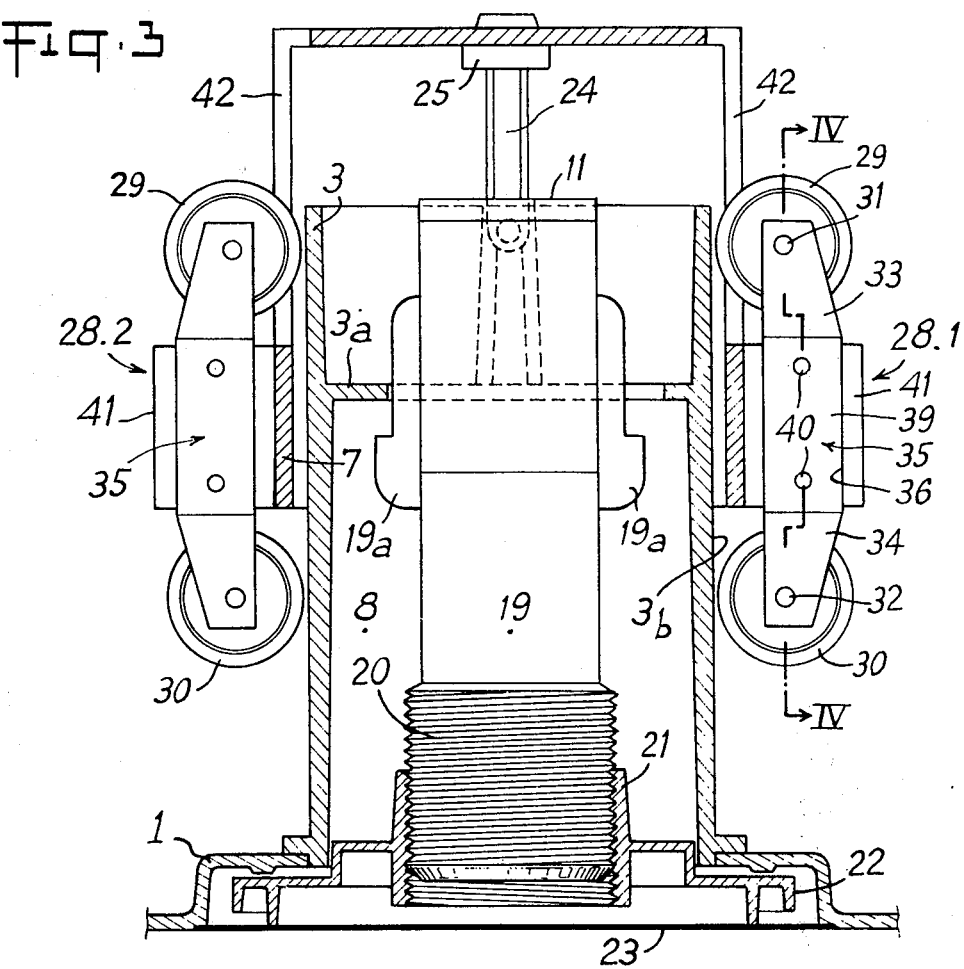
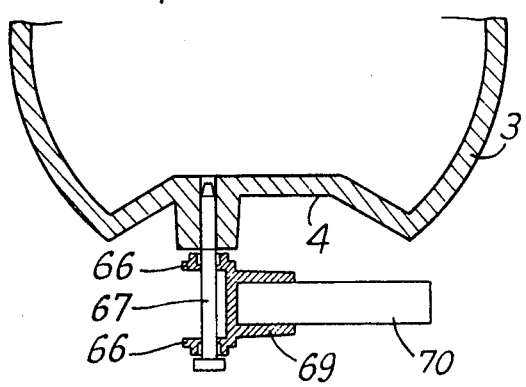
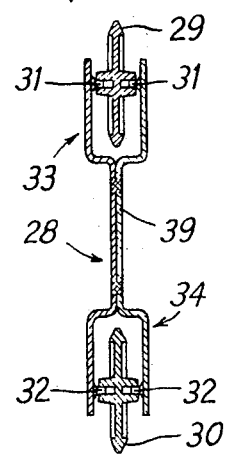

WEIGHING SCALES WITH VERTICAL GUIDANCE MEANS

BACKGROUND AND BRIEF SUMMARY OF THE INVENTION

The present invention relates to a set of weighing scales and aims more particularly at improving the guidance device of its movable portion relative to its fixed portion, the weight indicating device and the elastic device.

It aims at these two devices reducing friction to a minimum so that the elastic balancing device which measures the load is not disturbed by interfering phenomena. Consequently it improves the position and sensitivity of the weighing scales. Furthermore, the recommended constructional features lead to easy and economic manufacture within the framework of a mass production programme.

According to the invention the guidance device comprises at least three trains of rollers extending in radial planes passing through the guidance axis, whereby each roller idles about a rotation shaft which is orthogonal to the said guidance axis and being carried by one of the parts in such a way that between its tread and the other part there is a clearance sufficient so that contact with the latter can never occur with the complete system of rollers; wherein this guidance device cooperates with at least one anti-gyratory roller extending in a plane parallel to the guidance axis and which idles about a rotation shaft perpendicular to the said guidance axis carried by one of the parts and positioned with a clearance between two vertical elements of the other part; wherein the elastic device extends in accordance with the symmetrical guidance axis of the fixed part; wherein the indicating device placed between the fixed part and the moving part is of the floating type so that it is insensitive to the above-mentioned clearances and thereby transmits no opposing force to the elastic balancing device.

According to a particularly advantageous embodiment each guidance train comprises two rollers mounted loosely in terminal fork arms of an intermediate support comprising identical metal plates in the shape of the Greek letter omega and having straight branches, whereby these two plates are joined to one another by their median web and are fixed to one another and to the base of a positioning slot defined by a U-shaped member which projects radially over the part of the weighing scales to be equipped.

The anti-gyratory roller is mounted loosely in an intermediate cage comprising two identical omega-shaped metal plates having straight branches, whereby said two plates are joined by the extreme branches and are fixed to one another and to the base of a positioning slot defined by members projecting over that part of the weighing scales to be equipped.

The guidance roller trains are mounted on the outside of a sleeve of the movable part covering a passage or shaft in the fixed part, whereby the upper rollers pass through ports in this sleeve and all the rollers are able to come into contact with a cylindrical surface of the passage concentric to the guidance axis.

BRIEF DESCRIPTION OF THE DRAWINGS

Other and further objects of the present invention will be apparent from the following description and claims, and are illustrated in the accompanying drawings which by way of illustration show preferred embodiments of the present invention and the principles thereof, and what are now considered to be the best modes contemplated for applying these principles. Other embodiments of the invention embodying the same or equivalent principles may be used and structural changes may be made as desired by those skilled in the art without departing from the present invention and the scope of the appended claims. In the drawings show:

FIG. 3 is a partial section along the line III—III of FIG. 2;

FIG. 4 is a partial section along the line IV—IV of FIG. 3;

FIG. 5 is a partial section along the line V—V of FIG. 1.

DETAILED DESCRIPTION OF THE PREFERRED EMBODIMENTS

Figure 1:
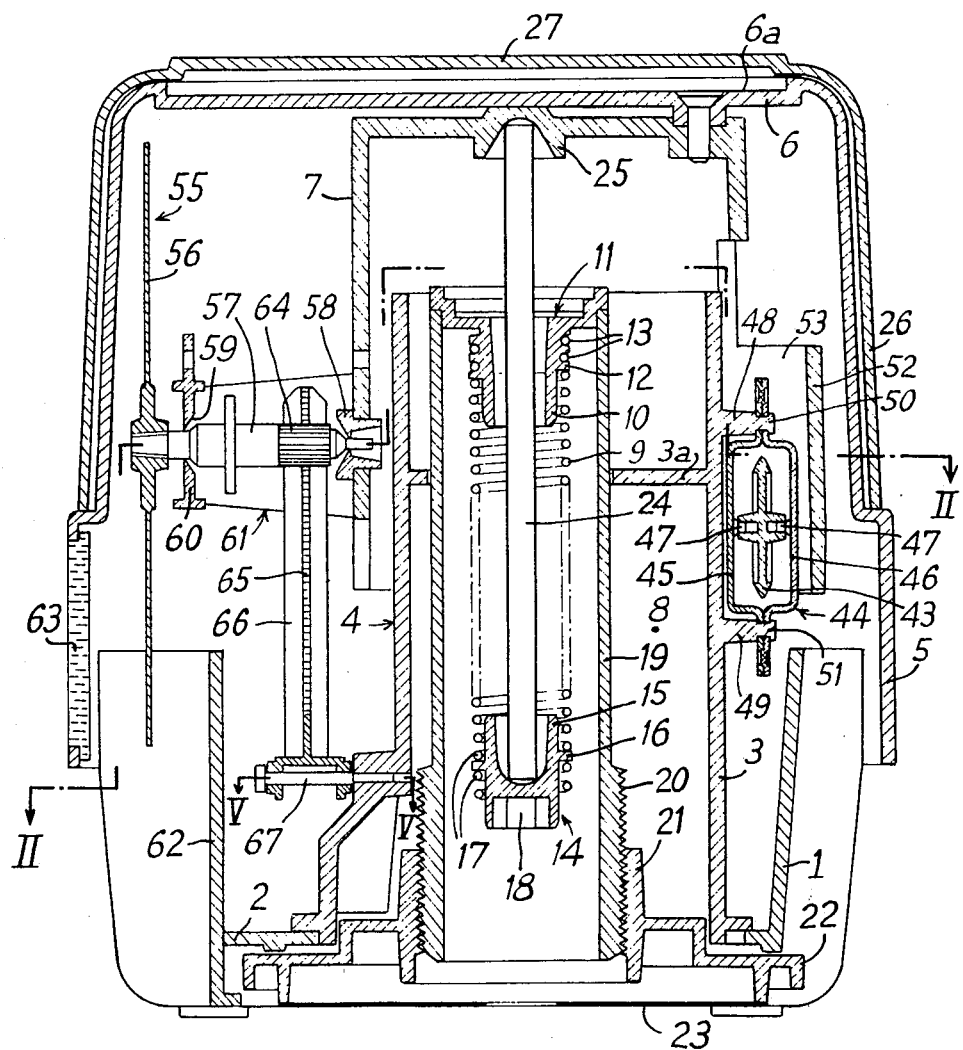
FIG. 1 is an axial sectional elevation of a set of weighing scales according to the invention.

The weighing scales comprise a hollow stand 1 to the base 2 of which is fixed a tubular passage 3 having a recess 4.

It also comprises a cover 5 covering stand 1 and whose top 6 is equipped with a sleeve 7 fitted onto the above-mentioned passage 3.

Sleeve 7 is guided in vertical translation relative to the said passage by means of a device to be described hereinafter.

Sleeve 7 and passage 3 define between them a cavity 8 wherein is located an elastic balancing device. This device comprises a helical spring 9 whose upper end is centred about the tubular skirt 10 of an end fitting 11, whereby said skirt is extended by a thread 12 onto which are screwed and locked the terminal turns 13 of the spring. In the lower end of the latter is provided a container 14 which serves to support the object to be weighed and to transmit the weight of this object to the said spring. The tubular skirt 15 of container 14 which serves to centre the lower end of the spring carries a projecting thread 16 which can be screwed to a greater or lesser extent into the terminal turn 17 of the said spring in order to calibrate the same. The screwing of thread 16 can be easily performed by means of a wrench cooperating with a slot having six splines 18 made in the free end of container 14.

The end fitting II is fitted into a tubular member 19 and abuts on its upper end. The lower end of member 19 which surrounds spring 9 has a threaded portion 20 cooperating with the threaded sleeve 21 of a wheel 22 which permits the zero setting of the weighing scales. Wheel 22 is guided in rotation in passage 3 and is immobilised in translation between the base 2 of the stand and a plate 23 joined to the latter.

In order to screw container 14 into spring 9 without it being necesary to disassemble the weighing scales, it is obviously advantageous to stop the rotation of tubular member 19 relative to passage 3. To this end said member has two projecting fins 19a which enter recesses provided in an annular transverse partition 3a of the said passage.

A transmission rod 24 which traverses the inner pipe of end fitting 11 and spring 9 is placed between the lower container 14 and an upper container 25 which is integral with the top 6 of the cover. In addition FIG. 1 shows that the object to be weighed is not directly supported by the top. To this end a receptacle is provided:

Either to contain the object or objects, in which case the removable receptacle is placed on top of the cover, its base 27 being centred in a recess 6a of the top 6 and is supported by the latter, Or to form a plate on which the object is placed, in which case the receptacle is fitted onto the cover, the reverse side of the base being visible.

It is important to point out that the various components of the elastic balancing device, i.e. spring 9, containers 14 and 25, transmission rod 24, tubular member 19, end fitting 11 and wheel 22 extend coaxially to one another.

As a result of this special arrangement the weighing operation can be performed in a precise and accurate manner. However, it is essential that sleeve 7 is correctly guided in vertical translation relative to passage 3, i.e. reducing friction to a minimum because this would have a prejudicial influence on the weighing precision. To this end a special guidance device is used.

This device comprises four roller trains 28.1 to 28.4 carried by sleeve 7 and cooperating with the outer cylindrical surface 29 of passage 3, the said surface being concentric to the axis of transmission rod 24.

Figure 2:
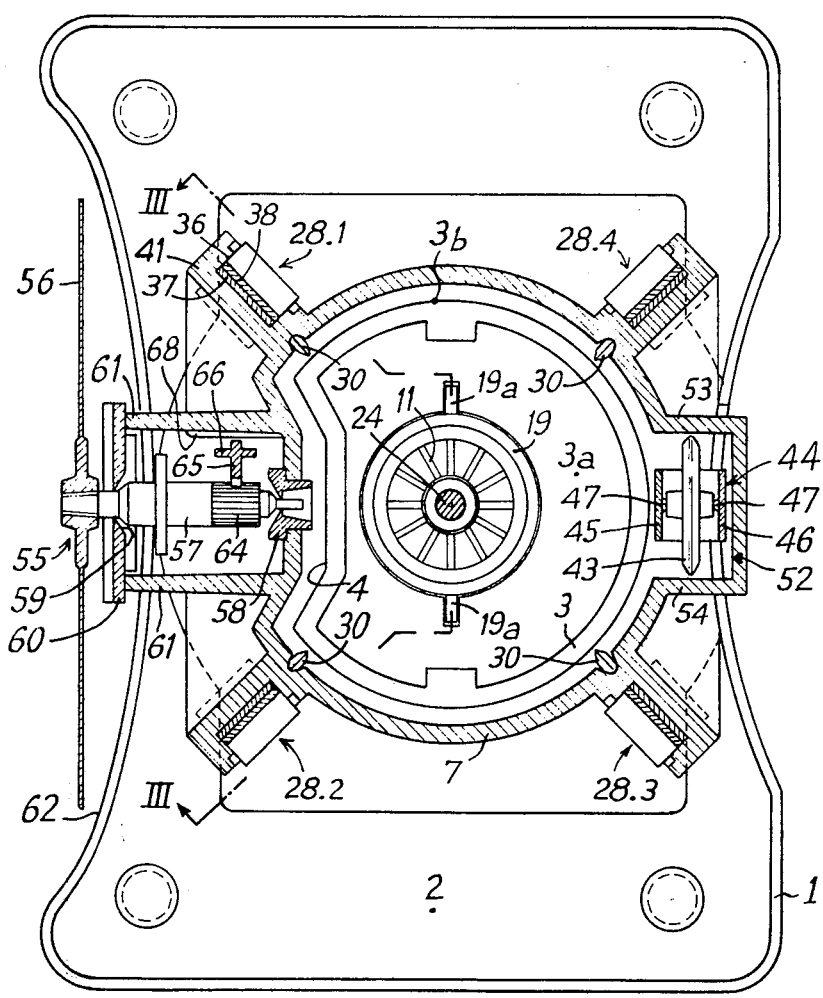
FIG. 2 is a cross-section along the line II—II of FIG. 1.

In the embodiment shown in FIGS. 2 and 3, each train 28 comprises two rollers 29,30 mounted loosely about shafts 31,32 and extending orthogonally to the axis of rod 24 in the same tangential plane in such a way that the said rollers are superimposed in the same radial plane. Shafts 31 and 32 are carried by the terminal fork arms 33,34 (FIG. 4) of a support 35 fixed in a slot 36 in sleeve 7.

In the selected embodiment each support 35 (FIGS. 2 to 4) comprises two identical omega-shaped plates 37, 38 having straight branches. These plates are joined by their median web in order to form a rigid body 39 which is positioned and fixed in slot 36 by means of lugs 40. The end branches of these plates arranged pairwise and staggered relative to one another form the above fork arms 33,34. They are also integral with pivots engaged in the holes of rollers and materialise the rotation shafts 31,32.

Each slot 36 is defined by a U-shaped member 41 projecting radially to the outside of sleeve 7 (FIG. 2). When each train 28 is fixed in the slot 36 of the corresponding member 41, the upper roller 29 passes through a port 42 in said sleeve whilst the lower roller 30 is located beneath the lower end thereof.

It is essential to point out (FIG. 3) that the roller trains 28.1 to 28.4 are installed in such a way that there is an adequate clearance between the tread of rollers 29,30 and the cylindrical surface 3b of the fixed passage 3 so that at any given time there can only be contact between certain of these rollers and not between all of them. Under these conditions friction is reduced to a minimum due to the use of a tread, the choice of a material with a low friction coefficient and the reduction in the number of contact points. Thus a guidance system is provided which does not produce any interfering phenomena which could prejudice the accuracy and precision of measurement of the elastic balancing device 9 to 25. However, despite the clearance provided the guidance isrectilinear and removes the elastic balancing device from lateral reactions which could result from unsatisfactory centering of the object being weighed on receptacle 26 relative to rod 24.

It would obviously be possible for sleeve 7 to rotate about the cylindrical surface 3b of the passage To prevent this the weighing scales have an anti-gyratory roller 43 extending in a tangential plane and carried by the fixed passage 3 and cooperating with the vertically movable sleeve 7.

In the embodiment shown in FIGS. 1 and 2, roller 43 idles in an intermediate cage 44 about a shaft which is radial relative to the transmission rod 24. Cage 44 comprises two omega-shaped metal plates 45,46 with straight branches. These plates are joined by their extreme branches (FIG. 1) in such a way that their webs are spaced apart and arranged on either side of roller 43. Moreover, the said webs are provided with pivots 47 which engage in holes in the said roller and for the latter materialise the above-mentioned free rotation shaft.

The extreme branches of plates 45,46 are fitted in positioning slots defined by members 48,49 and project over the fixed passage 3. They are fixed pairwise to the base of the corresponding slot by means of lugs 50,51.

Roller 43 mounted relative to the fixed passage 3 so as to idle about a radial spindle is engaged in a groove defined by a bridge 52 integral with sleeve 7, said groove issuing freely onto the lower edge of the latter as well as laterally facing the said passage.

It is important to note (FIG. 2) that the installation of the antigyratory roller 43 is carried out in such a way that between the tread thereof and the side walls 53,54 of bridge 52 there is an adequate clearance to ensure that contact is only possible with one side wall at any time so as to prevent any interfering friction.

Finally the weighing scales have an indicating device 55 (FIGS. 1, 2 and 5) placed between the fixed part and the moving part. This indicating device is of the floating type so that it is insensitive to the functional clearances made as indicated hereinbefore between the said parts and so that it transmits no opposing force to the elastic balancing device 9 to 25.

The indicating device comprises a rotary stepped disc 56 coupled to a shaft 57 whose ends are mounted loosely in a bearing 58 equipping the movable sleeve 7 and respectively in a chamfered hole 59 in a plate 60 joined to a fork arm 61 diametrically opposite to the anti-gyratory bridge 52 and belonging to the said sleeve 7.

The stepped disc 56 is positioned between cover 5 and a recessed portion 62 of stand 1. It is located facing a transparent window 63 of the said cover carrying a pointer of the indicated weight.

Shaft 57 is integral with a pinion 64 with which meshes a floating rack 65 projecting over a guide bar 66. At its lower end (FIGS. 1 and 5) guide bar 66 is pivotally mounted about a shaft 67 fixed to passage 3. Thus the guide bar extends vertically and its upper end is placed between pinion 64 and a rib 68 (FIG. 2) of the corresponding branch of the fork arm 61. Due to the clearance provided for the tangential deflection of the said upper end of the guide bar, a low amplitude angular movement is possible between sleeve 7 and passage 3 without this movement influencing the indication transmitted by pinion 64 and rack 65 and without the operation thereof being able to disturb the balance provided by the elastic device 9 to 25. However, it is necessary for rack 65 to be in continuous engagement with pinion 64. To this end the lower end of guide bar 66 (FIG. 5) is integral with a sleeve 69 into which is fitted a rod 70 which forms a counterweight and extends horizontally on the side of the pinion opposite to that where the rack is located. Thus rod 70 applies the latter to the pinion.

Obviously the components of the guidance device and of the indicating device which are vertically carried by the moving part can be carried by the fixed part and vice versa.

The improvements forming the object of the present invention are applicable to weighing scales and more particularly to those for domestic use.

The The invention is not limited to the embodiments described and represented hereinbefore, and various modifications can be made thereto without passing beyond the scope of the invention.

What is claimed is:

1. Weighing scales comprising a moving part which moves vertically relative to a fixed part and which serves to support the load against the action of an elastic balancing device, whereby a guidance device with rollers is placed between these two parts, wherein the guidance device comprises at least three trains of rollers extending in radial planes passing through the guidance axis, whereby each roller idles about a rotation shaft which is orthogonal to the said guidance axis and being carried by one of the parts in such a way that between its tread and the other part there is a clearance sufficient so that contact with the latter can never occur with the complete system of rollers; wherein this guidance device cooperates with at least one anti-gyratory roller extending in a plane parallel to the guidance axis and which idles about a rotation shaft perpendicular to the said guidance axis carried by one of the parts and positioned with a clearance between two vertical elements of the other part; wherein the elastic device extends in accordance with the symmetrical guidance axis of the fixed part; wherein the indicating device placed between the fixed part and the moving part is of the floating type so that it is insensitive to the above-mentioned clearances and thereby transmits no opposing force to the elastic balancing device.

2. Weighing scales according to claim 1, wherein the guidance roller trains are mounted externally of a sleeve of the moving part covering a passage in the fixed part, whereby the upper rollers traverse ports in this sleeve and all the rollers can come into contact with a cylindrical surface of the passage concentrically to the guidance axis.

3. Weighing scales according to claim 1, wherein the anti-gyratory roller is mounted outside a passage of the fixed part fitted into a sleeve of the moving part, said sleeve defining right up to its lower edge a groove whose side walls cooperate with the tread of the said roller.

4. Weighing scales according to claim 1, whose rotary member of the indicating device is operated by a rack and pinion assembly placed between the moving part and the fixed part, the rack pivoting and being applied to the pinion by a counterweight wherein a shaft connecting the rotary dial of the indicating device to the pinion is mounted so as to rotate relative to the moving part about a rotation shaft perpendicular to the guidance axis, and wherein the lower end of the floating rack is mounted so as to pivot on the fixed part about an axis substantially parallel to that of the above shaft.

5. Weighing scales according to claim 1, wherein each guidance train comprises two rollers mounted loosely in the end fork arms of an intermediate support whose median body is fitted into a lateral slot defined by that portion of the weighing scales to be equipped with the said rollers.

6. Weighing scales according to claim 5, wherein the support of each guidance train comprises two identical omega-shaped metal plates with straight branches which are joined to one another by their median web and are fixed together and to the base of a positioning slot defined by a U-shaped member which projects radially over that portion of the weighing scales to be equipped.

7. Weighing scales according to claim 1, wherein the anti-gyratory roller is mounted loosely in an intermediate cage whose ends are fitted into slots defined that portion of the weighing scales which is to be equipped with the said roller.

8. Weighing scales according to claim 7, wherein the above cage comprises two identical omega-shaped metal plates with straight branches and which are joined together by the end branches and fixed to one another as well as to the branch of positioning slots defined by the U-shaped members projecting over that part of the weighing scales which is to be equipped.

9. Weighing scales according to claim 1, whose elastic balancing device comprises a helical spring placed between the two parts and a zeroing wheel which regulates the elongation of the spring when the weighing scales are empty, wherein the spring is positioned coaxially in a tubular member and concentrically surrounds a transmission rod placed between the moving part and the lower end of the spring whose upper end is fixed to the top end of the tubular member; wherein the transmission rod is independent and abuts by its ends against a lower container fixed to the lower free end of the spring and against an upper container integral with the moving part; wherein the zeroing wheel is guided in rotation but immobilised in translation at the bottom of the fixed part, and has a cylindrical threaded sleeve cooperating with the lower threaded end of the tubular member; and wherein the lower container cooperating with the spring permits the calibration of the latter, and to this end has a tubular centering skirt integral with a projecting thread which can to a greater or lesser extent be screwed into the lower terminal turns of the said spring, said container being provided with a rotating means accessible via the zeroing wheel.

10. Weighing scales according to claim 9, wherein the end fitting integral with the upper end of the tubular member and provided for the fixing of the spring has for this purpose a thread which can be screwed and locked in the upper terminal turns of the spring and which projects over a tubular centering skirt.

* * * * *